UNITED STATES PATENT OFFICE.

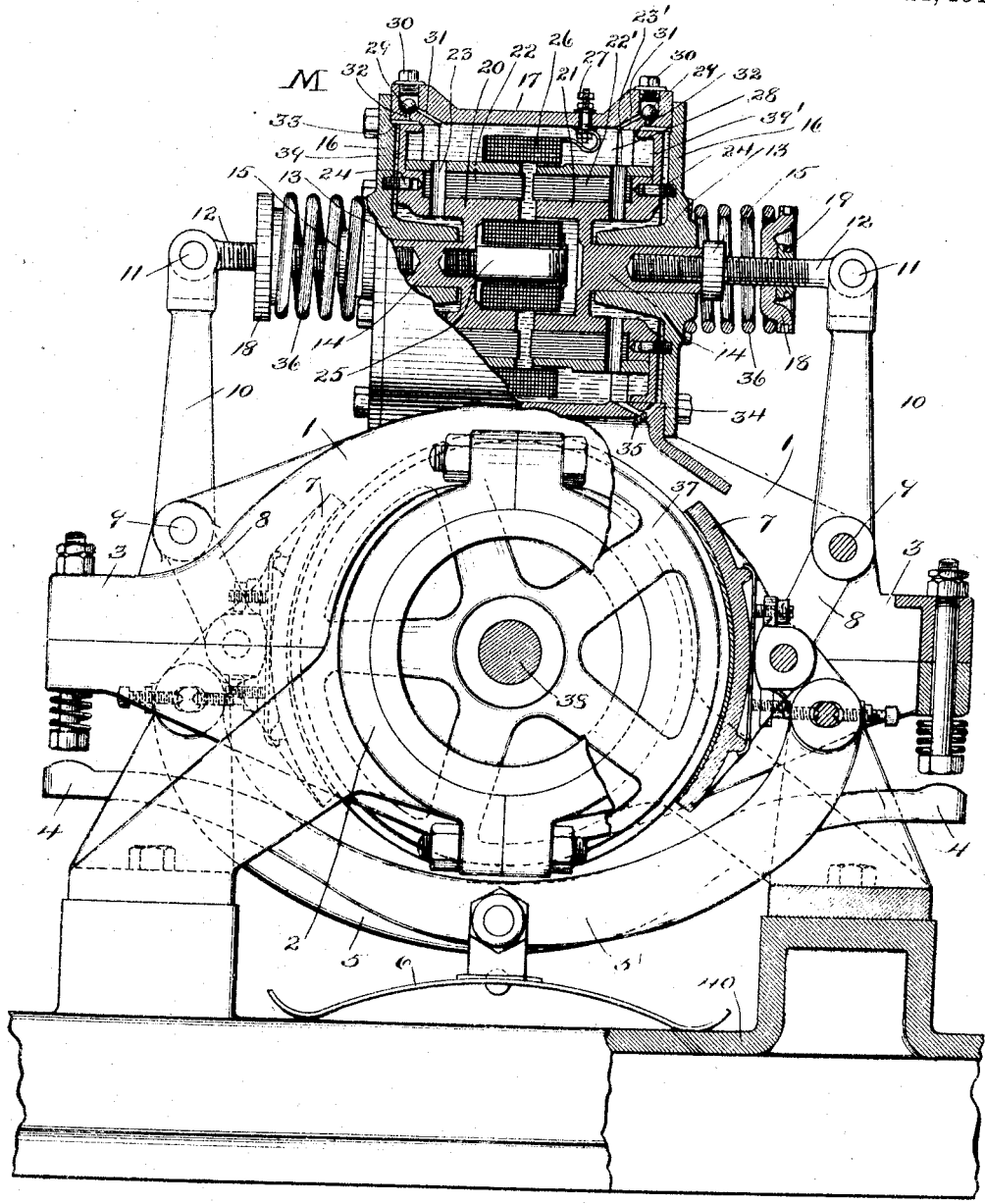

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

ALTERNATING-CURRENT ELECTROMAGNET.

987,146.        Specification of Letters Patent.     Patented Mar. 21, 1911.

Application filed August 18, 1906. Serial No. 331,196.

*To all whom it may concern:*

Be it known that I, DAVID L. LINDQUIST, a subject of the King of Sweden, residing in Yonkers, in the county of Westchester and State of New York, have invented a new and useful Improvement in Alternating-Current Electromagnets, of which the following is a specification.

My invention relates to electro-magnets and one of its objects is the provision of means for retarding the relative movement of the parts thereof in predetermined directions.

A further object of the present invention is the provision of a liquid dash-pot for an alternating current electro-magnet and an armature associated therewith.

Other objects of my invention will appear hereinafter, the novel combinations of elements being pointed out in the claims.

In the accompanying drawing I have shown my invention applied to an alternating current electro-magnet which is connected to a compound brake as an actuating device therefor. This illustration is merely for the purpose of pointing out a mode of application of my invention and it should therefore be understood that the application of the invention may be general.

In this particular instance an alternating current electro-magnet M is mounted on the movable frame 1 which in turn is mounted in the bearings 2.

3, 3 designate lateral arms projecting from the rotatable frame 1 and adapted to engage the outer ends 4, 4, respectively, of the brake levers 5, 5 which are suitably pivoted to fixed supports and carry at their inner ends the brake shoes 7, 7 associated with the brake pulley 37 which is fixed to the driving shaft 38 of a motor, for example. Opposite the brake shoes 7, 7 are an additional set of brake shoes pivoted to the brake arms 8, 8 which in turn are pivoted at 9, 9 to the rotatable frame 1. Rigidly connected with the arms 8, 8 are the substantially vertical arms 10 10 which are pivoted at 11, 11 to the screw threaded rods 12, 12.

The inner ends of the screw threaded rods 12, 12 pass into screw threaded openings in the extensions 14, 14 of the electro-magnet 20 and armature 21, respectively. The projections 14, 14 fit snugly within the bearings 13, 13 of the end plates 16, 16 of the casing which incloses the electro-magnet and armature. The distances of the electro-magnet and armature from the pivotal points 11 may be adjusted by reason of the screw threaded connections, and the parts then locked together by means of the nuts 15, 15. On the rods 12, 12 are also mounted the compression brake springs 36, 36, the tension of which may be varied by means of the nuts 18, 18, which latter are locked in position by means of the smaller nuts 19. The outer faces of the plates 16, 16 adjacent the bearings 13, 13, and the inner faces of the nuts 18, 18, are suitably formed to receive the springs 36, 36 and hold the same in proper position.

The electro-magnet 20 preferably comprises a plurality of poles each of which comprises laminations 22 held in position by dowel pins 23. The armature 21 comprises projections corresponding to the poles of the magnet and comprising also laminations 22' held in position by the dowel pins 23'. The solenoids 26 of the electro-magnet may be held in fixed position relative to the casing 17, but in this instance they are fixed to the electro-magnet 20 by means of the bolt 25. 27 designates an insulated terminal for the solenoids 26, but it should be understood that there may be a plurality of such terminals.

The electro-magnet may be wound for direct current if desired. In the majority of cases in practice, however, it is desirable only in connection with alternating current electro-magnets to provide means for retarding the motion of the movable parts actuated by the magnet. This is for the reason that an alternating current magnet tends to operate its armature and the parts connected thereto with a too sudden movement, which may injure such movable parts.

As shown in the drawing, the solenoids 26 are so connected to the polar projections of the magnet 20 that they leave recesses for the reception of the corresponding projections of the armature 21, and when in normal position said solenoids surround both the poles of the magnet and the projections of the armature. The winding for the electro-magnet may be single phase, two, phase, or multiphase. The form of winding is not herein illustrated as it does not *per se* form a part of this invention. As to such windings, reference should be made to my patents on electro-magnets, No. 733,549, granted July 14, 1903, No. 744,773, granted Nov. 24, 1903, and No. 764,608, granted July 12, 1904.

Both the electro-magnet 20 and the armature 21 in this instance have a longitudinal movement in the casing 17, each being guided by pins 24, 24 secured to the inner faces of the end plates 16, 16. Their movement is also guided by the projections 14, 14 in the bearings 13, 13, and by the pistons 39, 39' which fit snugly within the end portions of the casing 17. These pistons are connected respectively to the electro-magnet 20 and the armature 21, and are resisted in their movement by the insulating liquid 28 which is confined within the casing 17 and immerses the entire electro-magnet and the entire armature. Around each piston is a passage way 34 at a suitable point in the casing 17, but this passage way is made adjustable by means of the set screw 35 so as to restrict the flow of liquid from one side of a piston to the other. There may be one or more of the restricted passages 34. Other portions of the casing 17 near the face plates 16, 16 contain additional passages 31, 31, and 32, 32 which are normally closed by means of the ball check valves 29, 29. These check valves may be spring-pressed but in the drawing they are shown held in place by gravity and may be removed by unloosening the nuts 30, 30. The latter may also be employed to adjustably limit the movement of the balls 29, 29.

The operation of the entire construction as illustrated in the drawing is as follows: Upon sending current into the solenoids 26, both the electro-magnet and armature are energized and each tends to move toward the other with a sudden or quick movement if the magnet is a multiphase alternating current magnet. By reason of the position of the check valves, however, the liquid which is confined in the casing 17 must pass through the restricted passages 34, and by varying the size of this restricted passage, such movement may be regulated as desired. Obviously the electro-magnet may be fixed and the armature only made movable with respect to the casing 17, but in connection with the compound brake it is desirable to have both movable. Now when the electro-magnet is energized and the armature projections brought into engagement with the poles of the electro-magnet, the brake springs 36, 36 will be compressed and the primary brake shoes released from the brake pulley so that the motor may drive the shaft 38. The spring 6 bearing against the bed plate 40 and connected to the secondary brake levers 5, 5, normally maintain the secondary brake shoes 7, 7 out of contact with the brake pulley 37. Upon the deënergization of the electro-magnet, the springs 36, 36 will apply the primary brake shoes to the pulley 37 whereupon the momentum of the rotating parts will rotate the frame 1, primary brake, and the entire electro-magnetic device M. One of the arms 3 of the frame 1 will strike one of the brake levers 5 at its outer end 4 and thus apply the corresponding secondary brake shoe with sufficient force to bring the driven shaft 38 to rest. Upon such application of the primary brake the electro-magnet 20 and armature 21 will be moved back to normal position, and by reason of the check valves now being opened by the fluid flowing through the passages 31, 31, and 32, 32, such movement will be comparatively free. It will therefore be seen that when the magnet is energized the movements of the parts toward each other will be retarded by reason of the automatic closure of the check valves compelling the liquid to flow through the restricted passages. But on the return movement the check valves will be automatically opened and the liquid will have a comparatively free flow through the passages 32, 32, and 31, 31 from the outer sides of the pistons to the inner sides.

Obviously those skilled in the art may make various changes in the details and arrangement of parts without departing from the spirit and scope of my invention, and I desire therefore not to be limited to the precise construction herein disclosed.

Having thus described my invention, what I claim and desire to have protected by Letters Patent of the United States is:—

1. The combination with an electro-responsive device comprising a movable magnet and a movable armature mutually coacting, of means for immersing said device in an insulating liquid, and means controlled by said liquid for regulating the mutual action of the magnet and armature.

2. The combination with a mutually coacting magnet and armature movable toward and from each other, of a casing inclosing the same and containing liquid, and means associated with said liquid for materially restricting the movement of said co-acting members toward each other.

3. The combination with a mutually coacting magnet and armature movable toward and from each other, of a casing inclosing the same and formed with a plurality of passages, and a check valve associated with one of said passages.

4. The combination with an electro-responsive device comprising a mutually coacting magnet and armature, of a casing inclosing the same and formed with passages therein one of said passages being of a size to materially restrict the flow of a fluid therethrough, a check valve in one of said passages, and means for adjusting the size of said restricting passage, said passages governing the operation of the co-acting members.

5. The combination with an electro-responsive device comprising a movable magnet and a movable armature, of a casing inclosing said device, said casing having passages controlling the flow of liquid from one side to the other of said movable parts, a check valve associated with one of said passages, and an adjustable screw projecting into another of said passages.

6. The combination with an alternating current electro-magnet comprising a movable magnet and a movable armature, of a piston connected to each of said movable members, a casing entirely inclosing said electro-magnets and pistons and adapted to contain a fluid, said casing having a plurality of passages for the flow of fluid from one side to the other of each of said pistons, and check valves for regulating the movements of said pistons.

7. The combination with an electro-responsive device, of a casing inclosing the same and having a plurality of passages within the walls of the casing, a check valve associated with one of said passages, the other passage being of such size as to materially restrict the flow of a liquid therethrough.

8. The combination with an electro-responsive device, of a casing inclosing the same and formed with passages therein, a check valve in one of said passages, and means for adjusting the size of another of said passages to a size to materially retard the flow of a fluid therethrough.

9. The combination with an electro-responsive device having a movable member, of a casing inclosing said device, said casing being formed with passages adjacent said member, a check valve associated with one of said passages, and a set screw projecting into the other passage and restricting it sufficiently to materially retard the flow of a liquid therethrough.

10. The combination with an actuating device comprising a movable piston, of a casing inclosing said device, and adapted to contain a liquid, said casing having a plurality of passages externally of the piston for the flow of liquid from one side of said piston to the other, and a check valve for regulating the movements of said piston.

11. The combination with an alternating current electro-magnet, of a movable piston connected thereto, a casing entirely inclosing said electro-magnet and piston and forming a cylinder for the piston arranged to contain a fluid, said casing having a plurality of passages for the flow of fluid from one side of said piston to the other, and a check valve for regulating the movements of said piston.

12. The combination with an actuating device comprising a plurality of movable pistons, of a casing inclosing said device and adapted to contain liquid, said casing having a plurality of passages located externally of the pistons to permit the liquid to flow from one side to the other of said pistons, and check valves associated with some of said passages to restrict the movement of said pistons in predetermined directions.

13. The combination with an actuating device comprising two pistons movable toward and away from each other, of a casing for confining fluid and immersing said actuating device, said casing having a plurality of restricted passages for permitting the fluid to flow slowly from one side of said pistons to the other, and a plurality of check valves associated with free passages to permit free movement of said pistons in predetermined directions.

14. The combination with an electro-responsive device having a plurality of moving parts, of a casing for confining liquid and immersing the said device therein, said casing having passages extending through the walls of the casing and of a size to materially restrict the flow of a liquid therein for retarding the movement of said members in predetermined directions, and check valves associated with free passages in said casing.

15. The combination with an alternating-current electro-magnet, of an armature associated therewith, means for holding said armature and electro-magnet apart, a casing for confining an insulating liquid and immersing said electro-magnet and armature, two pistons fitting within said casing, one connected to the electro-magnet and the other to the armature, said casing having restricted passages around said pistons, and check valves associated with comparatively free passages in said casing to retard the movement of the armature and magnet toward each other when the latter is energized.

16. The combination with an electro-responsive device comprising a magnet and its armature, of a casing inclosing said device and adapted to contain a liquid, said casing being provided with passages permitting the flow of fluid past the armature, and a device adjustable from the exterior of the casing for varying the size of one of said passages.

In testimony whereof, I have signed my name to this specification in the presence of two subscribing witnesses.

DAVID L. LINDQUIST.

Witnesses:
CHARLES M. NISSEN,
HYATT L. GARRISON.

Copies of this patent may be obtained for five cents each, by addressing the "Commissioner of Patents, Washington, D. C."